United States Patent
Wada

(10) Patent No.: US 10,100,874 B2
(45) Date of Patent: Oct. 16, 2018

(54) SLIDING MEMBER AND SLIDE BEARING

(71) Applicant: TAIHO KOGYO CO., LTD., Toyota-shi, Aichi (JP)

(72) Inventor: Hitoshi Wada, Toyota (JP)

(73) Assignee: TAIHO KOGYO CO., LTD., Toyota-shi, Aichi (JP)

( * ) Notice: Subject to any disclaimer, the term of this patent is extended or adjusted under 35 U.S.C. 154(b) by 0 days.

(21) Appl. No.: 15/542,114

(22) PCT Filed: Dec. 1, 2015

(86) PCT No.: PCT/JP2015/083687
§ 371 (c)(1),
(2) Date: Jul. 7, 2017

(87) PCT Pub. No.: WO2017/094094
PCT Pub. Date: Jun. 8, 2017

(65) Prior Publication Data
US 2018/0258993 A1    Sep. 13, 2018

(51) Int. Cl.
| F16C 33/12 | (2006.01) |
| C22C 9/02 | (2006.01) |
| C23C 24/00 | (2006.01) |
| C25D 3/54 | (2006.01) |
| C23F 17/00 | (2006.01) |

(Continued)

(52) U.S. Cl.
CPC ............ *F16C 33/125* (2013.01); *B32B 15/01* (2013.01); *B32B 15/20* (2013.01); *C22C 9/00* (2013.01);

(Continued)

(58) Field of Classification Search
CPC .... F16C 33/125; F16C 17/10; F16C 2204/12; F16C 2204/18; C22C 9/00; C22C 9/02
See application file for complete search history.

(56) References Cited

U.S. PATENT DOCUMENTS 6,309,759 B1    10/2001   Tomikawa et al.
9,435,376 B2 *   9/2016   Gaertner ............... F16C 33/122
(Continued)

FOREIGN PATENT DOCUMENTS

| CN | 102168721 A | 8/2011 |
| DE | 100 32 624 A1 | 4/2001 |

(Continued)

OTHER PUBLICATIONS

Communication dated Feb. 5, 2018 from the State Intellectual Property Office of the P.R.C. in counterpart application No. 201580068636.2.

(Continued)

*Primary Examiner* — Thomas R Hannon
(74) *Attorney, Agent, or Firm* — Sughrue Mion, PLLC

(57) ABSTRACT

There is provided a technique which can realize both of conformability and fatigue resistance.
A sliding member and a slide bearing include a base layer and a coating layer provided on the base layer and having a sliding surface on which a counter material slides, and are characterized in that the coating layer is formed of a soft material which is softer than that for the base layer; and that, in the sliding surface, crystal grains of the soft material having an average grain diameter of 0.1 μm or more and 1 μm or less are aggregated into lumps, thereby forming aggregates having an average diameter of 3 μm or more and 30 μm or less.

3 Claims, 5 Drawing Sheets

(51) Int. Cl.
*C25D 7/10* (2006.01)
*B32B 15/01* (2006.01)
*B32B 15/20* (2006.01)
*F16C 17/10* (2006.01)
*C22C 9/00* (2006.01)

(52) U.S. Cl.
CPC .............. *C22C 9/02* (2013.01); *C23C 24/00* (2013.01); *C23F 17/00* (2013.01); *C25D 3/54* (2013.01); *C25D 7/10* (2013.01); *F16C 17/10* (2013.01); *B32B 2255/06* (2013.01); *B32B 2255/205* (2013.01); *B32B 2307/536* (2013.01); *F16C 2204/12* (2013.01); *F16C 2204/18* (2013.01)

(56) References Cited

U.S. PATENT DOCUMENTS 9,523,387 B2 * 12/2016 Fortune .................. C23C 28/02
2009/0245702 A1 * 10/2009 Kagohara ............. B32B 15/012
384/42

FOREIGN PATENT DOCUMENTS

| | | |
|---|---|---|
| JP | 2001-020955 A | 1/2001 |
| JP | 2003-156045 A | 5/2003 |
| JP | 2005-105354 A | 4/2005 |
| JP | 2014-196765 A | 10/2014 |
| JP | 2014196764 A | 10/2014 |
| JP | 2015-203461 A | 11/2015 |
| JP | 2015-227490 A | 12/2015 |
| WO | 2015/186621 A1 | 12/2015 |

OTHER PUBLICATIONS

Supplementary European Search Report dated May 2, 2018 in counterpart European Application No. 15909724.5.
International Search Report for PCT/JP2015/083687, dated Mar. 1, 2016.
Written Opinion for PCT/JP2015/083687, dated Mar. 1, 2016.

* cited by examiner

SLIDING MEMBER AND SLIDE BEARING

TECHNICAL FIELD

The present invention relates to a sliding member and a slide bearing each having a sliding surface on which a counter shaft slides.

BACKGROUND ART

A sliding member having an overlay of Bi formed thereon is known (see Patent Literature 1). In Patent Literature 1, the overlay is formed so that the density of Bi particles to be precipitated is 50 to 300 particles/100 μm$^2$, thereby improving conformability and wear resistance.

CITATIONS LIST

Patent Literature 1: JP 2003-156045 A

SUMMARY OF INVENTION

Technical Problems

However, in Patent Literature 1, when the density of Bi particles to be precipitated is adjusted within 50 to 300 particles/100 μm$^2$, the fatigue resistance (strength) of the overlay can be improved, but the problems of difficulty in deformation of the overlay and reduction in conformability are raised.

The present invention has been made in light of the problem, and an object thereof is to provide a technique which can realize both conformability and fatigue resistance.

Solutions to Problems

In order to attain the object, a sliding member and a slide bearing according to the present invention include a base layer and a coating layer provided on the base layer and having a sliding surface on which a counter material slides, and are characterized in that the coating layer is formed of a soft material which is softer than that for the base layer; and that, in the sliding surface, crystal grains of the soft material having an average grain diameter of 0.1 μm or more and 1 μm or less are aggregated into lumps, thereby forming aggregates having an average diameter of 3 μm or more and 30 μm or less.

In the above configuration, the average grain diameter of the crystal grains of the soft material is defined as 0.1 μm or more and 1 μm or less, thereby making it possible to improve the coating strength of the coating layer on the sliding surface, based on the Hall-Petch relationship, and also to improve fatigue resistance. Further, the formation of aggregates in which the crystal grains of the soft material are aggregated into lumps makes it possible to improve conformability through deformation of the aggregates. Namely, it is possible not only to improve fatigue resistance by virtue of the fine crystal grains but also to improve conformability through deformation of the aggregates.

The average grain diameter of the crystal grains is defined as 1 μm or less, thereby making it possible to prevent the shortage of fatigue resistance. Also, the definition of the average diameter of the aggregates as 3 μm or more makes it possible to prevent the shortage of the deformation amount of the aggregates. On the other hand, the average diameter of the aggregates is defined as 30 μm or less, thereby making it possible to prevent the failure of proper formation of an oil film due to the coarse aggregates and the deterioration in seizure resistance. When the coating layer is formed so that the product of the average grain diameter of the crystal grains and the average diameter of the aggregates is 3 or more, good fatigue resistance and conformability can be realized.

Also, the soft material may be Bi, Sn, Pb, In or Sb. All of Bi, Sn, Pb, In and Sb have small hardness (for example, Mohs hardness), and are suitable as soft materials. The advantageous effects of the present invention, as explained above, are exerted also in the slide bearing having the features of the present invention.

DESCRIPTION OF EMBODIMENTS

Figure 1:
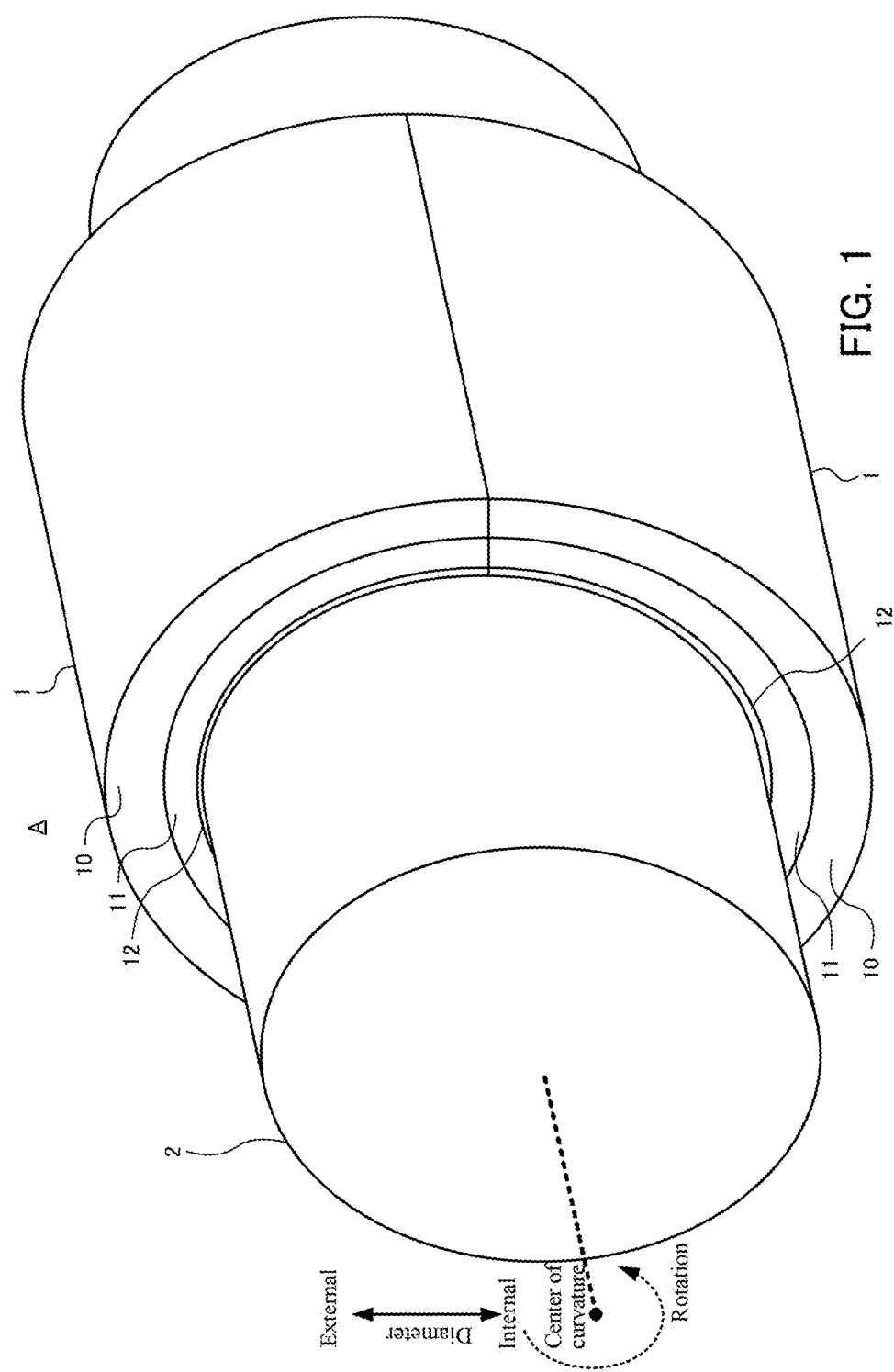
FIG. 1 is a perspective view of a sliding member according to an embodiment of the present invention.

Now, an embodiment of the present invention will be described in the following order.
(1) First Embodiment:
(1-1) Configuration of sliding member:
(1-2) Measurement method:
(1-3) Method for producing sliding member:
(2) Experimental results:
(3) Other embodiments:

(1) First Embodiment (1-1) Configuration of Sliding Member:

FIG. 1 is a perspective view of a sliding member 1 according to one embodiment of the present invention. The sliding member 1 includes a back metal 10, a lining 11 and an overlay 12. The sliding member 1 is a halved metal member obtained by bisecting a hollow cylinder in the diameter direction, and has a semi-arc-shaped cross section. Two sliding members 1 are assembled into a cylindrical shape, so that a slide bearing A is formed. The slide bearing A bears a columnar counter shaft 2 (crankshaft of an engine) in its hollow portion formed inside. The outer diameter of the counter shaft 2 is formed so as to be slightly smaller than the inner diameter of the slide bearing A. A lubricant oil (engine oil) is supplied to a clearance formed between the outer peripheral surface of the counter shaft 2 and the inner peripheral surface of the slide bearing A. At that time, the outer peripheral surface of the counter shaft 2 slides on the inner peripheral surface of the slide bearing A.

The sliding member 1 has a structure such that the back metal 10, lining 11 and overlay 12 are laminated in turn in the descending order of distance from the center of curvature. Thus, the back metal 10 constitutes the outermost layer of the sliding member 1, and the overlay 12 constitutes the innermost layer of the sliding member 1. The back metal 10, lining 11 and overlay 12 each have a constant thickness in the circumferential direction. The back metal 10 has a thickness of 1.3 mm; the lining 11 has a thickness of 0.2 mm; and the overlay 12 has a thickness of 20 µm. The radius of the surface located on the side of the center of curvature of the overlay 12 (the inner diameter of the sliding member 1) is 40 mm. Hereinafter, the "internal (inside)" means the side of the center of curvature of the sliding member 1, whereas the "external (outside)" means the side opposite to the center of curvature of the sliding member 1. The internal surface of the overlay 12 constitutes a sliding surface on which the counter shaft 2 slides.

The back metal 10 is formed of steel containing 0.15 wt % of C and 0.06 wt % of Mn, the balance consisting of Fe. It is noted that the back metal 10 only has to be formed of a material which can support the load from the counter shaft 2 via the lining 11 and overlay 12, and may not necessarily be formed of steel.

The lining 11 is a layer which is laminated on the inside of the back metal 10, and constitutes a base layer of the present invention. The lining 11 contains 10 wt % of Sn and 8 wt % of Bi, the balance consisting of Cu and inevitable impurities. The inevitable impurities in the lining 11 include, for example, Mg, Ti, B, Pb and Cr, and are impurities mixed during refining or scraping. The content of inevitable impurities is 1.0 wt % or less as a whole.

The overlay 12 is a layer which is laminated on the internal surface of the lining 11, and constitutes a coating layer of the present invention. The overlay 12 includes Bi and inevitable impurities. The content of the inevitable impurities is 1.0 wt % or less.

Figure 2A:
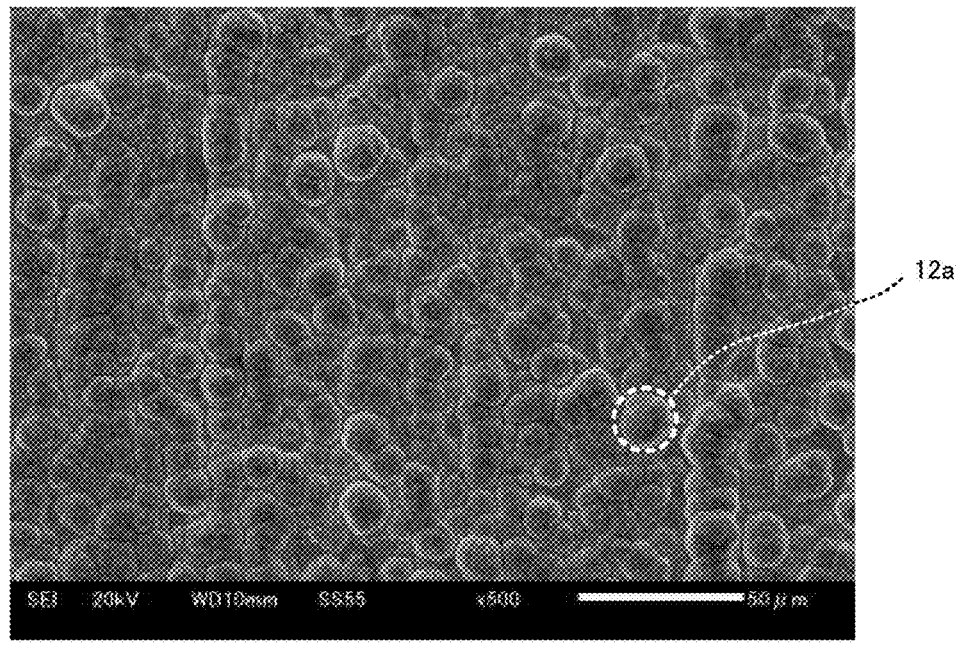
FIG. 2A is a microphotograph of a sliding surface.

FIG. 2A is microphotograph of the internal surface of the overlay 12. As shown in FIG. 2A, many lump aggregates 12a are formed in the internal surface of the overlay 12, i.e., the sliding surface on which the counter shaft 2 slides. In this embodiment, the average diameter, which is an average value for the diameter of the aggregates 12a in a direction parallel to the sliding surface, was 14 µm.

Figure 2B:
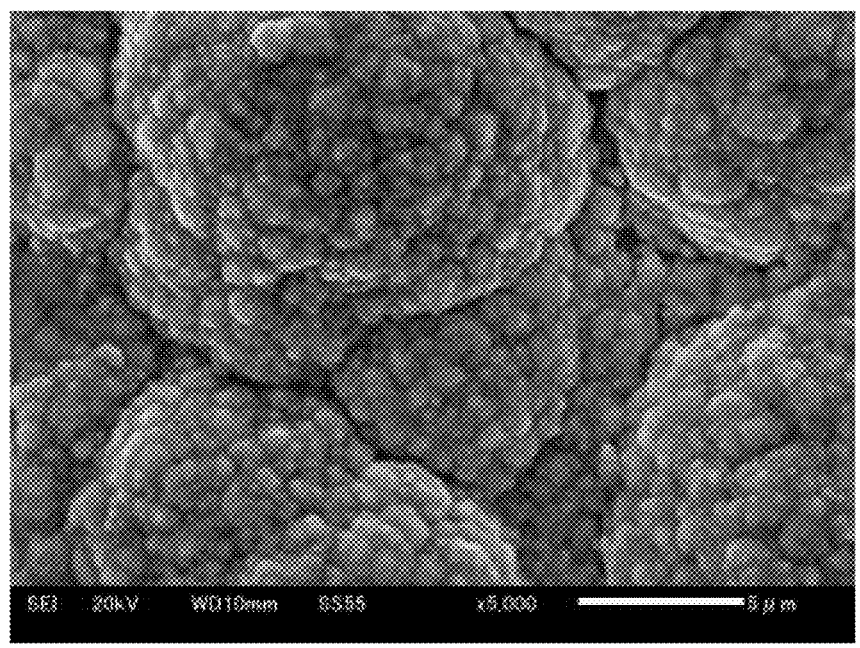
FIG. 2B is a microphotograph of an aggregate.

FIG. 2B is a microphotograph of the aggregate 12a. As shown in FIG. 2B, the aggregate 12a is a polycrystalline body formed by aggregating many Bi crystal grains into a lump. In this embodiment, the average grain diameter of the Bi crystal grains on the surface of the aggregate 12a was 0.7 µm.

The deformation amount of the overlay 12 in a compression test was as good as 2.4 µm. The phrase "deformation amount of the overlay 12" means the reduction amount of the thickness of the overlay 12 at the time of compressing the sliding member 1 in a compression test.

In the sliding member 1 explained above, the average grain diameter of the Bi crystal grains is adjusted to 0.7 µm, thereby making it possible to improve the coating strength of the coating layer on the sliding surface based on the Hall-Petch relationship and to improve fatigue resistance. Further, the formation of the aggregates 12a in which the Bi crystal grains are aggregated into lumps makes it possible to improve conformability through the deformation of the aggregates 12a. In brief, it is possible to improve fatigue resistance by virtue of the fine crystal grains and, simultaneously, to improve conformability through the deformation of the aggregates 12a.

(1-2) Measurement Method:

The numerical values indicated in the above embodiment were measured by the following technique. The masses of the elements constituting the respective layers of the sliding member 1 were measured by an ICP emission spectrophotometer (ICPS-8100 manufactured by Shimadzu Corporation).

The thicknesses of the respective layers were measured by the following procedures. Firstly, the cross section, in the diameter direction, of the sliding member 1 was polished by a cross section polisher (IB-09010CP manufactured by JEOL Ltd.). Then, the cross section of the sliding member 1 was photographed at a magnification of 7,000 with an electron microscope (JSM-6610A manufactured by JEOL Ltd.), thereby obtaining an image data of an observation image (reflected electron image). Then, the observation image was analyzed by an image analyzing device (LUZEX AP manufactured by NIRECO), thereby measuring the film thickness.

The average grain diameter of the Bi crystal grains in the overlay 12 was measured by the following procedures. Firstly, any observation visual field range having an area of 425 µm$^2$ in the internal surface of the overlay 12 (rectangular range of 17 µm in vertical length×25 µm in lateral length) was photographed (in the vertical view) at a magnification of 5,000 with an electron microscope (JSM-6610A manufactured by JEOL Ltd.), thereby obtaining image data of an observation image (reflected electron image). Then, the observation image was subjected to microtomy to measure the grain diameter of the Bi crystal grains. In this microtomy, the length of a line segment formed on the observation image was divided by the number of the crystal grains through which the line segment passed, thereby measuring the grain diameter of the crystal grains on the line segment. Further, the arithmetic average value (total value/number of line segments) of the grain diameters of the crystal grains, which was measured for each of the plurality of line segments, was measured as the average grain diameter.

Also, the average diameter of the Bi aggregates 12a in the overlay 12 was measured by the following procedures. Firstly, any observation visual field range having an area of 0.0425 mm$^2$ in the internal surface of the overlay 12 (rectangular range of 0.17 mm in vertical length×0.25 mm in lateral length) was photographed (in the vertical view) at a magnification of 500 with an electron microscope (JSM-6610A manufactured by JEOL Ltd.), thereby obtaining image data of an observation image. Then, the observation image was input in an image analyzing device to extract the edges (boundaries at which the brightness, saturation or hue angle is different by a predetermined value or more) of the aggregates 12a which were present in the observation image. Further, the image analyzing device was used to extract the regions closed by the edges as images of the Bi aggregates 12a, from the observation image.

The image analyzing device was used to measure the circle diameter equivalent to the projected area (measurement parameter: HEYWOOD) for the images of all the Bi aggregates 12a which were present within the observation visual field range. The "circle diameter equivalent to the projected area" is a diameter of a circle having an area equivalent to the projected area of the Bi aggregate 12a, which is obtained by converting the diameter of a circle having an area equivalent to the area of the image of the Bi aggregate 12a into an actual length based on the optical magnification. Further, the arithmetic average value (total value/number of aggregates) for the circle diameter equivalent to the projected area of all the aggregates 12a was measured as the average diameter of the Bi aggregates 12a. When the circle diameter equivalent to the projected area is less than 1.0 µm, the reliability of the circle diameter equivalent to the projected area and the specific reliability of the substance are decreased. Therefore, such cases were not taken into consideration at the time of calculating the average circle equivalent diameter of the Bi aggregates 12a.

Figure 3:
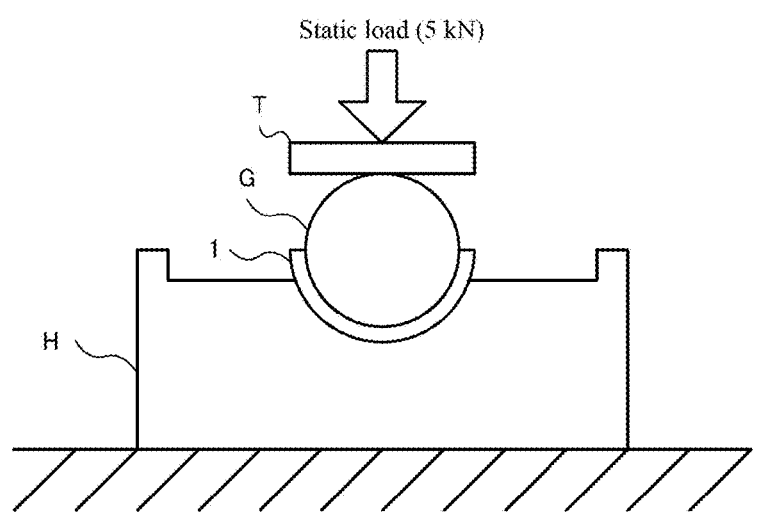
FIG. 3 is an explanatory view of a compression test.

The deformation amount of the overlay 12 was measured by the following procedures. FIG. 3 is an explanatory view of a compression test. As shown in this figure, static load was caused to act on the halved sliding member 1 placed on a housing H, which could be substantially regarded as a rigid body, to carry out the compression test. A semi-columnar concave part having a diameter corresponding to the outer diameter of the sliding member 1 was formed in the housing H, and the sliding member 1 was placed along the concave part. A columnar counter shaft G having a diameter corresponding to the inner diameter of the sliding member 1 was provided, and the counter shaft G was placed on the internal surface of the sliding member 1. Further, an autograph (AG-IS manufactured by Shimadzu Corporation) was used to measure the reduction amount of the thickness of the sliding member 1 as the deformation amount of the sliding member 1, while causing 50-kN static load to act on the counter shaft G via a plastic plate T.

(1-3) Method for Producing Sliding Member:

Firstly, a flat plate of low carbon steel having the same thickness as that of the back metal 10 was provided.

Next, a powder of a material constituting the lining 11 was sprayed on the flat plate formed of low carbon steel. Specifically, a Cu powder, a Bi powder and a Sn powder were mixed so as to attain the mass ratio among the respective components in the lining 11 described above, and the powder mixture was sprayed on the flat plate of low carbon steel. It is only necessary to satisfy the mass ratio among the respective components in the lining 11, and an alloy powder of Cu—Bi or Cu—Sn and the like may be sprayed on the flat plate of low carbon steel. The grain diameter of the powder was adjusted to 150 μm or less by means of a testing sieve (JIS Z8801).

Then, the flat plate of low carbon steel and the powder sprayed on the flat plate were sintered. The sintering temperature was controlled to 700° C. to 1000° C., and the sintering was conducted in an inert atmosphere. After sintering, the sintered product was cooled. After completion of cooling, a Cu alloy layer is formed on the flat plate of low carbon steel. This Cu alloy layer would contain soft Bi particles precipitated during cooling.

Then, the low carbon steel having the Cu alloy layer formed thereon was pressed so as to be formed into a shape such that a hollow cylinder was bisected in the diameter direction. At this time, the pressing was conducted so that the outer diameter of the low carbon steel was coincident with the outer diameter of the sliding member 1.

Then, the surface of the Cu alloy layer formed on the back metal 10 was machined. At this time, the machining amount was controlled so that the thickness of the Cu alloy layer formed on the back metal 10 was identical with that of the lining 11. Thus, the lining 11 can be formed by the Cu alloy layer after machining. The machining was conducted by using a lathe set with a machining tool material formed of sintered diamond, for example.

Then, the overlay 12 was formed by laminating Bi as the soft material, at a thickness of 12 μm, on the surface of the lining 11 by electroplating. The procedures of Bi electroplating were defined as follows. Firstly, the surface of the lining 11 was defatted by flowing current to the surface of the lining 11 in an electrolyte. Next, the surface of the lining 11 was washed with water. Further, the surface of the lining 11 was washed with an acid to remove an unnecessary oxide. Thereafter, the surface of the lining 11 was washed with water again. After completion of the above pretreatment, Bi electroplating was conducted by supplying current to the lining 11 immersed in a plating bath.

The conditions for Bi electroplating of the overlay 12 were defined as follows. The bath composition of the plating bath was designed so as to have a Bi concentration: 10 g/L, an organic sulfonic acid concentration: 25 g/L to 100 g/L and an additive (polyethylene glycol) concentration: 0.5 g/L to 50 g/L. The bath temperature of the plating bath was adjusted to 50%. Further, the current supplied to the lining 11 was rectangular pulse current having a duty rate of 50%, and the average current density thereof was defined as 1 A/dm$^2$.

Figure 4A:
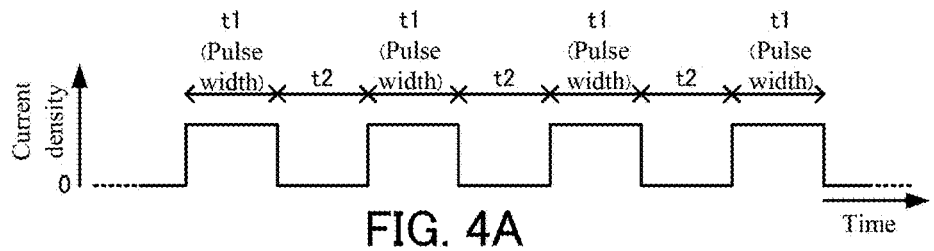
FIG. 4A is a graph showing the pulse current in Bi electroplating.

FIG. 4A is a graph showing the pulse current in Bi electroplating. The horizontal axis in FIG. 4A indicates the time, and the vertical axis indicates the pulse current (magnitude of the current density). As shown in FIG. 4A, the ratio between the duration of the time t1 during which the current flows (pulse width) and the duration of the time t2 during which the current does not flow is 1:1 (duty rate=50%). In this embodiment, the pulse width was changed to adjust the average grain diameter of the Bi crystal grains and the average diameter of the aggregates 12a of Bi crystal grains.

Figure 4B:
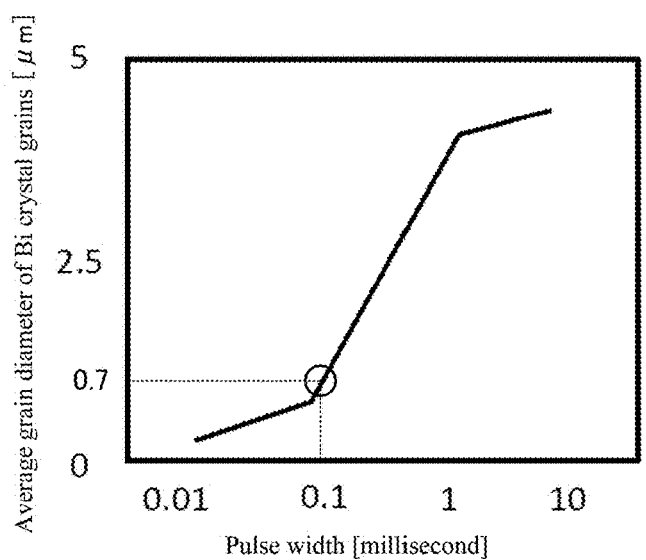
FIG. 4B is a graph of the average grain diameter of Bi crystal grains.

FIG. 4B is a graph of the average grain diameter of the Bi crystal grains. The horizontal axis in FIG. 4B indicates the pulse width, and the vertical axis indicates the average grain diameter of the Bi crystal grains. As shown in this figure, the pulse width is changed while the duty rate and average current density are kept constant, so that the average grain diameter of the Bi crystal grains can be adjusted. Specifically, the pulse width is increased so that the average grain diameter of the Bi crystal grains can be adjusted to be larger.

Figure 4C:
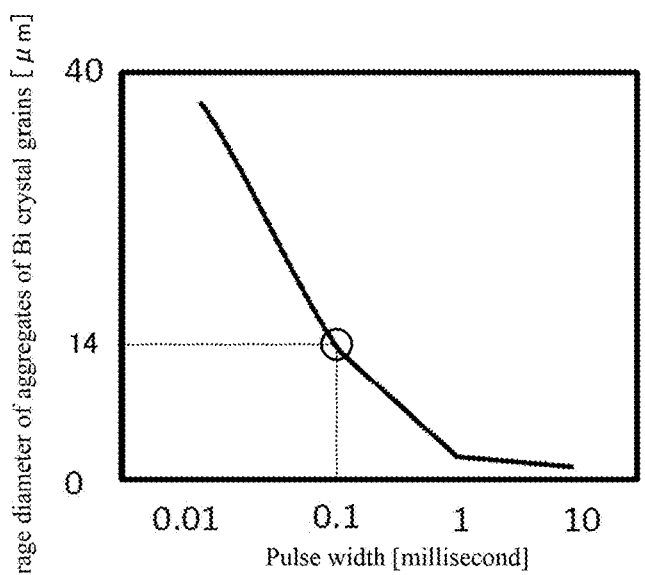
FIG. 4C is a graph of the average diameter of aggregates of the Bi crystal grains.

FIG. 4C is a graph of the average diameter of the aggregates of the Bi crystal grains. The horizontal axis in FIG. 4C indicates the pulse width, and the vertical axis indicates the average diameter of the aggregates of the Bi crystal grains. As shown in this figure, the pulse width was changed while the duty rate and average current density are kept constant, so that the average diameter of the aggregates of Bi crystal grains can be adjusted. Specifically, the pulse width is increased so that the average grain diameter of the Bi crystal grains can be adjusted to be smaller. In this embodiment, the pulse width was adjusted to 0.1 millisecond, thereby adjusting the average grain diameter of the Bi crystal grains to 0.7 μm and also adjusting the average diameter of the aggregates of the crystal grains to 14 μm.

After lamination of the overlay 12, water-washing and drying were conducted, and then the sliding member 1 was completed. Further, the two sliding members 1 were assembled into a cylinder shape, thereby completing a slide bearing A.

(2) Experimental Results

TABLE 1

|  | Average grain diameter of Bi crystals [μm] | Average diameter of aggregates [μm] | Deformation amount [μm] |
|---|---|---|---|
| Sample 1 | 0.5 | 0 | 0.2 |
| Sample 2 | 1 | 3 | 1.7 |
| Sample 3 | 0.5 | 7 | 1.9 |
| Sample 4 | 0.7 | 9 | 2.4 |
| Sample 5 | 0.1 | 30 | 1.8 |

Table 1 indicates results of measurement of the deformation amount for each of the average grain diameters of the Bi crystals in the overlay 12 and each of the average diameters of the Bi aggregates 12a. Sample 1 is a comparative example free of Bi aggregate 12a and having an almost flat sliding surface. Samples 1 to 5, which were different in average grain diameter of the Bi crystals and average diameter of the Bi aggregates 12a, were produced by a method similar to the production method described above. However, the average grain diameter of the Bi crystals was adjusted by adjusting the current density and pulse width in electroplating of the overlay 12.

Figure 5A:
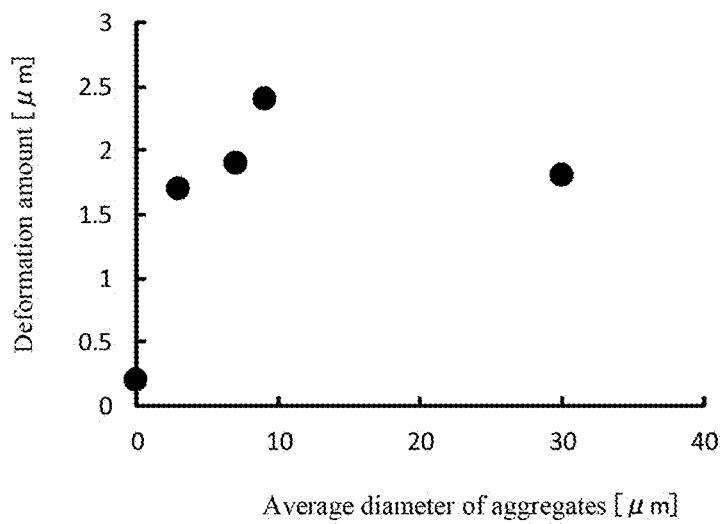
FIG. 5A is a graph of the deformation amount.

FIG. 5A is a graph showing the deformation amount for each of the average diameters of the Bi aggregates 12a. As shown in this figure, it has been understood that the average diameter of the aggregates 12a is increased within a region where the average diameter of the Bi aggregates 12a is 10 µm or less, thereby making it possible to sharply increase the deformation amount. Also, it has been understood that a large deformation amount can be obtained stably in a region where the average diameter of the Bi aggregates 12a is 10 µm or more. Therefore, it has been understood to be more desirable to define the average diameter of the Bi aggregates 12a as 10 µm or more in order to obtain conformability necessary as the slide bearing A.

Figure 5B:
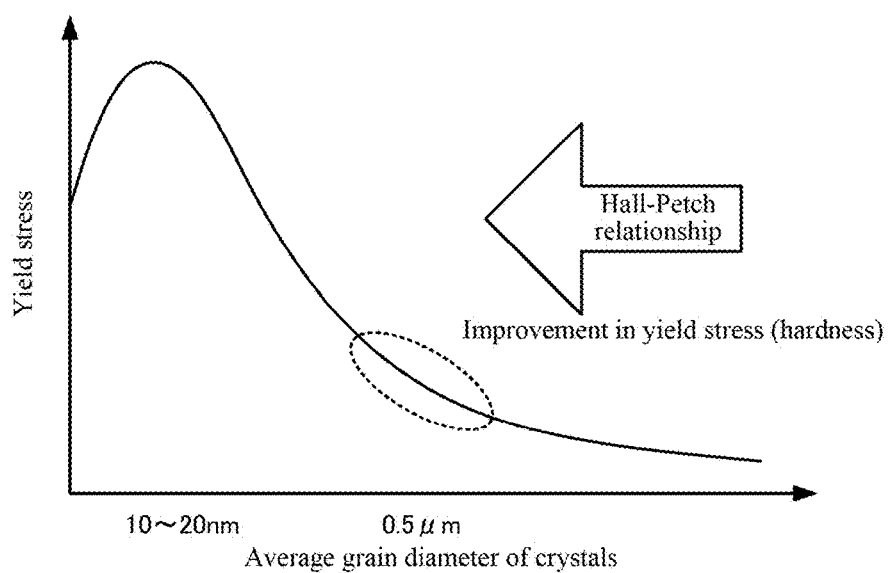
FIG. 5B is a graph of the yield stress.

FIG. 5B is a graph showing the relationship between the average grain diameter of the crystals and the yield stress (cited document: T. G. Nieh, Lawrence Livermore National Lab). As shown in this figure, the yield stress becomes maximum at a crystal grain diameter of about 10 mm to 20 nm, and, in a region where the crystal grain diameter becomes larger than this crystal grain diameter range, the yield stress decreases as the average grain diameter becomes larger based on the Hall-Petch relationship. It has been understood that the average grain diameter of the Bi crystals is defined as about 0.5 µm, thereby obtaining appropriately-great yield stress and hardness appropriate as the hardness of the aggregates 12a.

(3) Other Embodiments

The above embodiment has exemplified the sliding member 1 constituting the slide bearing A which bears the crankshaft of an engine, but a slide bearing A for other applications may be formed by the sliding member 1 of the present invention. For example, gear bushing, piston pin bushing and boss bushing for transmissions may be formed by the sliding member 1 of the present invention. Also, the material for the matrix of the lining 11 is not limited to Cu alloys, and is preferably selected according to the hardness of the counter shaft 2. Also, any material may be employed so long as it is softer than that for the lining 11, and may be any of Pb, Sn, In and Sb.

REFERENCE SIGNS LIST

1 . . . Sliding member
2 . . . Counter shaft
10 . . . Back metal
11 . . . Lining
12 . . . Overlay
12a . . . Aggregate

The invention claimed is:

1. A sliding member comprising a base layer and a coating layer provided on the base layer and having a sliding surface on which a counter material slides, wherein
    the coating layer is formed of a soft material which is softer than that for the base layer; and
    in the sliding surface, crystal grains of the soft material having an average grain diameter of 0.1 µm or more and 1 µm or less are aggregated into lumps, thereby forming aggregates having an average diameter of 3 µm or more and 30 µm or less.

2. The sliding member according to claim 1, wherein the soft material is Bi, Sn, Pb, In or Sb.

3. A slide bearing comprising a base layer and a coating layer provided on the base layer and having a sliding surface on which a counter material slides, wherein
    the coating layer is formed of a soft material which is softer than that for the base layer; and
    in the sliding surface, crystal grains of the soft material having an average grain diameter of 0.1 µm or more and 1 µm or less are aggregated into lumps, thereby forming aggregates having an average diameter of 3 µm or more and 30 µm or less.

* * * * *